United States Patent [19]

Hattori et al.

[11] Patent Number: 4,467,406
[45] Date of Patent: Aug. 21, 1984

[54] RINGING CONVERTER

[75] Inventors: Masayuki Hattori, Hachioji; Shigeo Nakamura, Hino, both of Japan

[73] Assignee: Fanuc Ltd., Tokyo, Japan

[21] Appl. No.: 313,613

[22] Filed: Oct. 21, 1981

[51] Int. Cl.$^3$ ............................................. H02P 13/20
[52] U.S. Cl. ......................................... 363/19; 363/19
[58] Field of Search ........................ 363/18, 19, 97; 331/112

[56] References Cited

U.S. PATENT DOCUMENTS

| | | | |
|---|---|---|---|
| 3,435,320 | 3/1969 | Lee et al. | 331/112 |
| 3,943,425 | 3/1976 | Kupka et al. | 363/19 |
| 4,166,213 | 8/1979 | Hoover | 250/213 VT |
| 4,172,276 | 10/1979 | Kameya | 363/19 |
| 4,263,643 | 4/1981 | Koike | 363/19 |

Primary Examiner—William H. Beha, Jr.
Attorney, Agent, or Firm—Staas & Halsey

[57] ABSTRACT

A ringing converter of the type having an output voltage stabilizing circuit connected on the primary side of a transformer. The converter is further provided with a circuit for detecting the primary current, which is proportional to the load current on the secondary side of the transformer. This enables detection of a change in the output voltage due to fluctuation in the load current on the secondary side, as detected by the detecting circuit. A signal indicative of the detected change is fed back to an oscillator circuit in order to stabilize the output voltage.

6 Claims, 5 Drawing Figures

RINGING CONVERTER

BACKGROUND OF THE INVENTION

This invention relates to a DC-to-DC converter, particularly, to the type referred to as a ringing converter.

A ringing converter has a simple circuit construction and has its input and output sides DC-separated by means of a transformer. For this reason a ringing converter is often used as a low-power DC-to-DC converter in apparatus of the type in which the internal circuitry of the apparatus is to be DC-separated from the power supply. A ringing converter of such type may comprise a blocking oscillator including a single transistor and a transformer having primary, secondary and positive feedback windings, and a rectifier circuit for rectifying the AC voltage developed by the secondary winding of the transformer. In operation, a direct current which applied to the blocking oscillator is converted into a prescribed AC voltage thereby, the prescribed AC voltage then being rectified by the rectifier circuit in order to obtain a DC voltage of a prescribed voltage value. A disadvantage encountered in the conventional ringing converters is that the DC voltage output fluctuates widely when there is a change in the load current on the output side, or when there is a fluctuation in the DC voltage input. The conventional ringing converters therefore are not suitable for application to power supplies connected to electronic circuits that demand relatively stable power supply voltages.

SUMMARY OF THE INVENTION

Accordingly, an object of the present invention is to provide a ringing converter having a stable output voltage.

Another object of the present invention is to provide a ringing converter whose output voltage exhibits little fluctuation even when the input voltage fluctuates.

Still another object of the present invention is to provide a ringing converter whose output voltage exhibits little fluctuation even when there is a change in the load current.

A further object of the present invention is to provide a novel ringing converter having an output stabilizing circuit, in which it is possible to compensate for a voltage drop caused by the resistance of the secondary winding.

According to the present invention, the foregoing and other objects are attained by providing a ringing converter of the type having a circuit for stabilizing the converter output voltage connected to the primary side of the transformer constituting the blocking oscillator circuit, and having a circuit for detecting the primary current, which is proportional to the load current on the secondary side of the transformer, thus enabling detection of a change in the output voltage caused by fluctuation of the load current on the secondary side as detected by the detecting circuit. A signal indicative of the detected change in the output voltage is fed back to the blocking oscillator circuit, whereby the DC voltage output of the ringing converter is stabilized.

These and other features and advantages of the present invention will be apparent from the following description taken in connection with the accompanying drawings, in which like reference characters designate the same or similar parts.

DESCRIPTION OF THE PREFERRED EMBODIMENT

A preferred embodiment of the present invention will now be described, referring first to FIGS. 1 through 3 for a discussion of the short-comings encountered in the conventional ringing converter that the present invention seeks to overcome.

Figure 1:
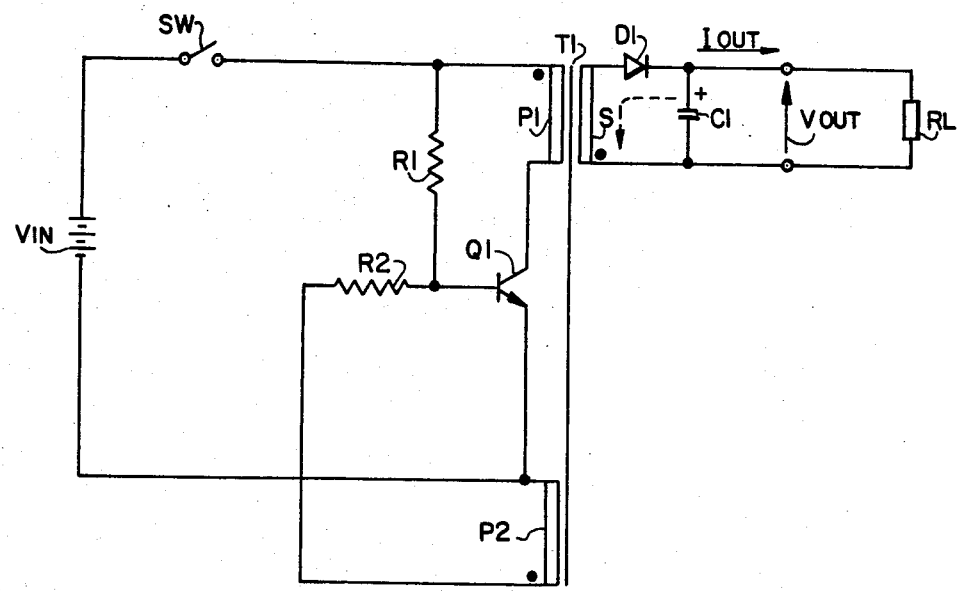
FIGS. 1 and 2 are circuit diagrams of a conventional ringing converter.

A ringing converter of the type to which the present invention is drawn has the general circuit configuration shown in FIG. 1. Here a blocking oscillator is constructed by a transformer $T_1$ and a transistor $Q_1$. When the switch SW is closed, a minute current flows into the base of transistor $Q_1$ through a resistor $R_1$, rendering the transistor $Q_1$ slightly conductive so that a minute voltage is impressed upon the primary winding $P_1$ of transformer $T_1$. As a result, a voltage is induced in the second primary winding $P_2$ of the transformer, causing an increase in the base current of the transistor $Q_1$ via the resistor $R_2$, so that the transistor conducts to a greater degree. Since the arrangement is for positive feedback, transistor $Q_1$ attains the fully conductive state instantaneously. The current flowing in the primary winding $P_1$, namely the collector current of the transistor $Q_1$, increases with time from the moment of conduction, but an upper limit is imposed upon the collector current due to the current amplification factor of transistor $Q_1$. This upper limit gives rise to an increase in the collector potential with time, which in turn diminishes the base current, thereby further elevating the collector potential. Again, due to the effects of positive feedback, the transistor $Q_1$ is rendered completely non-conductive instantaneously. When transistor $Q_1$ is cut off in this manner, a voltage is developed due to the magnetic energy which has been stored in the primary winding $P_1$ up to the moment of cut-off. This voltage charges a capacitor $C_1$ through a secondary winding S and a diode $D_1$, giving rise to an output voltage $V_{out}$. At the same time, the base of transistor $Q_1$ is negatively biased so that the transistor is held in the non-conductive state. When the magnetic energy drops off to zero, the voltages developed by the primary winding $P_2$ and secondary winding S attempt to fall off to a value of zero. At this time, however, a current flows in the direction of the broken arrow for a period equivalent to the recovery time of the diode $D_1$, the current returning to zero abruptly upon lapse of the recovery time. When this occurs a very small kick voltage is generated by the primary winding $P_2$, so that a current flows into the base of transistor $Q_1$ through resistor $R_2$, along with a current from resistor $R_1$, thereby again rendering transistor $Q_1$ conductive. The result is sustained oscillation in the manner described. With the conventional arrangement of this type, any fluctuation in the load current $I_{out}$ or in the input voltage $V_{in}$ gives rise to a large fluctuation in the output voltage $V_{out}$.

Figure 2:
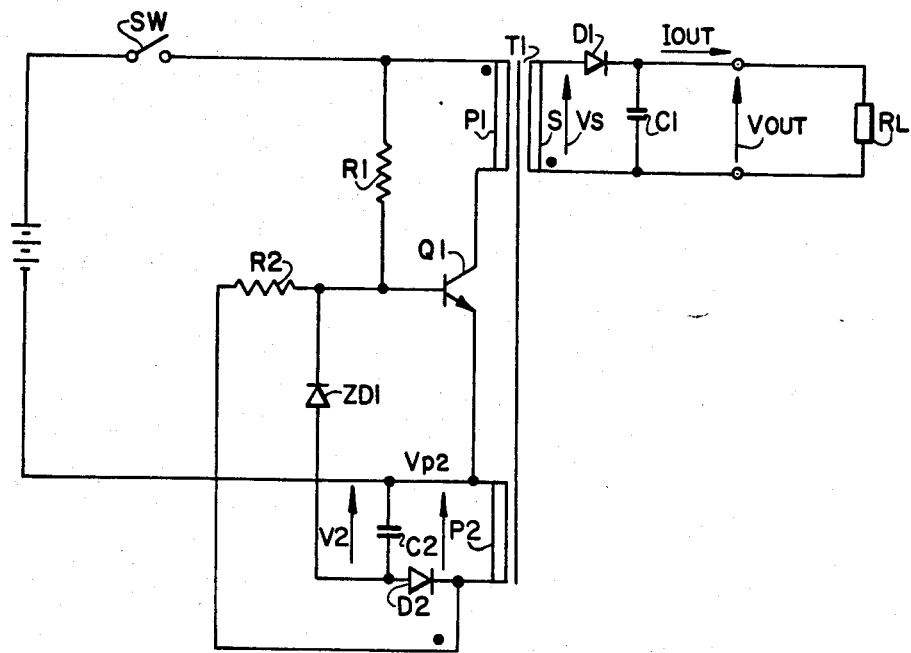
Figure 3:
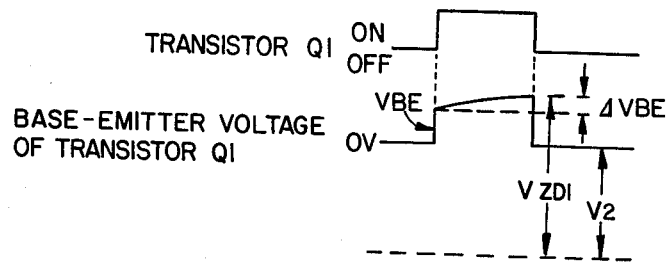
FIG. 3 is a graph of the base potential of a transistor for producing oscillation.

The arrangement of FIG. 2 represents an improvement over the ringing converter arrangement of FIG. 1. The conducting action of transistor $Q_1$ is the same as in the circuit of FIG. 1 as far as conduction start-up and the continuation of oscillation are concerned. However, a difference is observed in connection with a Zener diode $ZD_1$ and a voltage developed by a capacitor $C_2$ when the transistor $Q_1$ is rendered non-conductive. Specifically, as far as the relationship between the Zener diode $ZD_1$, voltage $V_2$ and the operation of transistor $Q_1$ is concerned, it is obvious, in terms of direct currents, that transistor $Q_1$ operates in such a manner that the voltage $V_2$ does not become larger than the Zener voltage $V_{ZD1}$. Transistor $Q_1$ operates in the same manner even in one period of oscillation. When transistor $Q_1$ conducts, the collector current increases with time but, due to the emitter resistance, a voltage ascribable to the collector current appears and is applied to the base potential. This voltage $V_{BE}$, as shown in FIG. 3, is limited by the Zener voltage $V_{ZD1}$ and voltage $V_2$, so that the transistor $Q_1$ tends to be shifted toward the cut-off state due to the insufficient base current. Thus, the voltage $V_{BE}$ determines the transistor conduction time. In accordance with circuit operation the voltage $V_2$ grows in size as the conduction time increases. Since the circuit operates with negative feedback, however, the conduction time decreases as the voltage $V_2$ increases. Accordingly, although voltage $V_2$ fluctuates due to the minute voltage change $\Delta V_{BE}$ in the base-emitter voltage $V_{BE}$, stabilization is achieved. Furthermore, if it is assumed that primary winding $P_2$ and secondary winding S have the same number of turns, their respective outputs $V_2$, $V_{out}$ will also be the same if the diodes $D_1$, $D_2$ drop equivalent voltages. Thus, if $V_2$ is stabilized, the same will be true for $V_{out}$. Nevertheless, the current flowing in primary winding $P_2$ is very small, and the current flowing in secondary winding S is larger and fluctuates constantly due to fluctuation in load. This means that the voltage drop due to the resistance of the secondary winding is not of a negligible magnitude, the result being an error in the output voltage.

The ringing converter of the present invention, constructed to eliminate the foregoing shortcomings, will now be described with reference to FIGS. 4 and 5.

Figure 4:
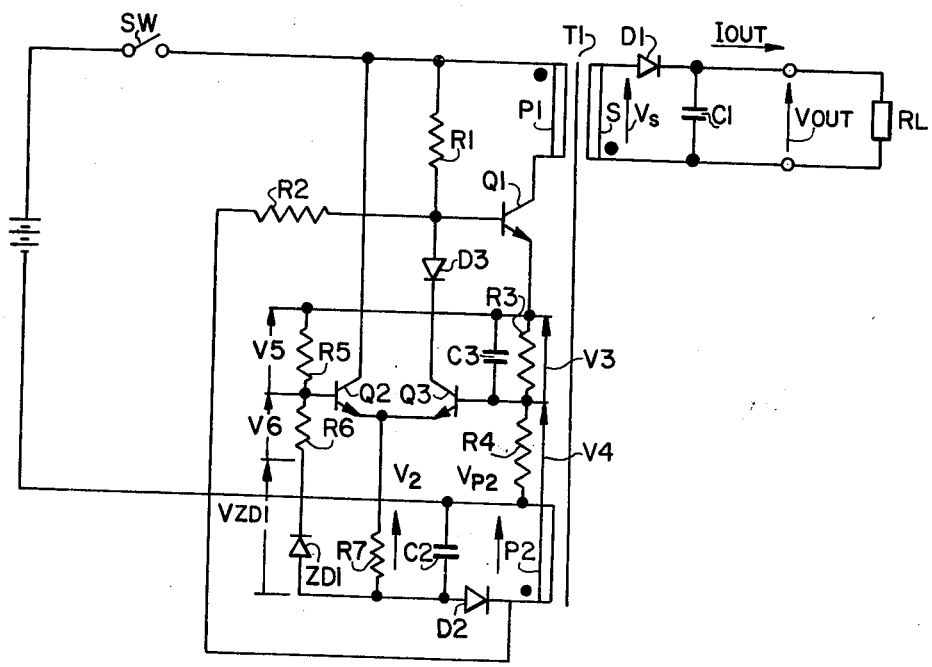
FIG. 4 is a circuit diagram of an embodiment of a ringing converter according to the present invention.

It will be appreciated from FIG. 4 that a differential amplifier comprising transistors $Q_2$, $Q_3$ and resistor $R_7$ is added to the ringing converter having the output voltage stabilizing circuit of FIG. 2. Though the oscillation and stabilization principles are the same as described in connection with FIG. 2, the present arrangement is constructed based on the fact that the current flowing in the primary winding $P_1$ is approximately proportional to the current $I_{out}$ flowing through the secondary winding S. Specifically, the arrangement is such that the change in the output voltage $V_{out}$ attributed to the change in load and the winding resistance of the secondary winding S, are compensated for on the primary side, thereby suppressing fluctuation of the output voltage $V_{out}$. To be more specific, the mean value of the emitter current of transistor $Q_1$ can be detected as the voltage $V_3$ by means of the resistor $R_3$ and capacitor $C_3$ which are connected to the emitter, but this value expresses also the mean value of the current of primary winding $P_1$ when the base current is neglected. In the abovementioned differential amplifier comprising transistors $Q_2$, $Q_3$ and resistor $R_7$, transistor $Q_3$ conducts when its base potential exceeds that of transistor $Q_2$, thereby drawing a base current from transistor $Q_1$ which is therefore cut off. Resistor $R_4$, corresponding to the emitter resistance of transistor $Q_1$ in the circuit of FIG. 2, detects the emitter current (which is approximately equivalent to the current flowing through primary winding $P_1$) which increases with time once transistor $Q_1$ starts conducting. The voltage $V_4$ developed by resistor $R_4$ is applied to the input terminal (the base of transistor $Q_3$) of the differential amplifier. The bases of transistors $Q_2$, $Q_3$ are at the same potential when transistor $Q_1$ makes the transistion from the conductive to the nonconductive state, the voltage $V_2$ can be expressed as follows:

$$V_2 = V_{ZD1} + V_6 + V_5 - V_3 - V_4 = V_{ZD1} + V_6 - V_4 \quad (1)$$

so that $$V_5 = V_3$$

Ignoring the base current of transistor $Q_2$ gives:

$$V_6 = \frac{R_6}{R_5} V_5 = \frac{R_6}{R_5} V_3 \quad (2)$$

Substituting the above in Eq. (1) gives:

$$V_2 = V_{ZD1} + \frac{R_6}{R_5} V_3 - V_4 \quad (3)$$

Figure 5:
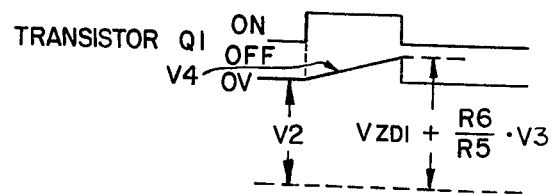
FIG. 5 is a graph of the conduction time of the transistor $Q_1$ included in the circuit of FIG. 4, as well as the shape of the voltage $V_4$ of the circuit of FIG. 4.

The relationship between the voltage $V_2$ and the transistor conduction time is as shown in FIG. 5.

Since the voltage $V_4$ can be set to a negligibly small value, and since the voltage $V_3$ is proportional to the output current $I_{out}$, $V_2$ can be written as follows:

$$V_2 = V_{ZD1} + \frac{R_6}{R_5} \cdot k \cdot I_{out} \quad (4)$$

where k is the proportion factor.

Letting primary winding $P_2$ and secondary winding S have the same number of turns, and letting diodes $D_2$, $D_1$ develop equivalent voltage drops, and further, letting r represent the internal resistance of the secondary winding S, the output voltage $V_{out}$ may be expressed as follows:

$$V_{out} = V_2 + V_{D2} - r \cdot I_{out} - V_{D1} = V_2 - r \cdot I_{out} \quad (5)$$

Substituting Eq. 4 in Eq. 5 gives:

$$V_{out} = V_{ZD1} + \frac{R_6}{R_5} k \cdot I_{out} - r \cdot I_{out} \quad (6)$$

$$= V_{ZD1} + \left(\frac{R_6}{R_5} \cdot k - r\right) I_{out}$$

By suitably selecting the various constants so as to establish the relation $$\frac{R_6}{R_5} \cdot k = r,$$

the relation $V_{out} = V_{ZD1}$ can be established. This shows that the output voltage will be constant regardless of any fluctuation in the load current.

It will be evident from the foregoing detailed description that the present invention is based on the fact that the load current of the secondary side of the transformer is proportional to the current on the primary side of the transformer in a ringing converter having an output voltage stabilizing circuit, and that the invention is therefore so constructed as to detect, in the primary side, the load current which prevails on the secondary side to thereby compensate for a variation in the output voltage caused by a fluctuation in the load current, said compensation being effected also on the primary side. Thus it is possible to obtain a stabilized, constant output voltage even with fluctuations in load and supply voltage, the results being superior to those seen in the prior art.

As many apparently widely different embodiments of the present invention can be made without departing from the spirit and scope thereof, it is to be understood that the invention is not limited to the specific embodiment thereof except as defined in the appended claims.

What we claim is:

1. A ringing converter operatively connected to receive a power source voltage, and operatively connectable to a load having a load current and voltage, comprising:
   a transformer having first and second primary windings and a secondary winding;
   switching means, operatively connected between said first and second primary windings to receive said power source voltage to said first and second primary windings;
   detecting means, operatively connected to said switching means and to said second primary winding, for detecting the current in the primary windings and for providing a control signal responsive to the current in said primary windings;
   stabilizing means including a differential amplifier means being operatively connected to said switching means, to said second primary winding and to said detecting means, said stabilizing means compensating for resistance in the secondary winding and amplifying said control signal and controlling said switching means in accordance with said amplified control signal such that the load current and voltage is stabilized via said switching means in accordance with said control signal.

2. A ringing converter according to claim 1, wherein said switching means comprises a transistor having a collector operatively connected to said first primary winding, a base operatively connected to receive said power source voltage and an emitter operatively connected to said second primary windings.

3. A ringing converter according to claim 2, wherein said switching means further comprises a resistor operatively connected between said power source voltage and said base.

4. A ringing converter according to claim 1, wherein said detecting means comprises said second primary winding, and a resistance operatively connected between said switching means and said second primary winding.

5. A ringing converter according to claim 1, wherein said differential amplifier means comprises:
   a first transistor having a base operatively connected to receive said control signal, an emitter operatively connected to said second primary winding, and a collector operatively connected to said switching means;
   second transistor having a collector operatively connected to receive said power source voltage, an emitter operatively connected to said emitter of said first transistor and a base operatively connected to said detecting means and said second primary winding.

6. A ringing converter according to claim 5, wherein said differential amplifier means further comprises a Zener diode operatively connected between said base of said second transistor and said second primary winding.

* * * * *

UNITED STATES PATENT AND TRADEMARK OFFICE
CERTIFICATE OF CORRECTION

PATENT NO. : 4,467,406
DATED : August 21, 1984
INVENTOR(S) : Hattori et al.

It is certified that error appears in the above-identified patent and that said Letters Patent is hereby corrected as shown below:

On the title page:
In the title "RINGING CONVERTER" should be --REGULATED SINGLE ENDED, SELF-OSCILLATING DC-DC CONVERTER--.
Column 4, line 44, "r" should be --$\underline{r}$--.

Signed and Sealed this

Fifth Day of March 1985

[SEAL]

Attest:

DONALD J. QUIGG

Attesting Officer    Acting Commissioner of Patents and Trademarks